Patented Nov. 1, 1927.

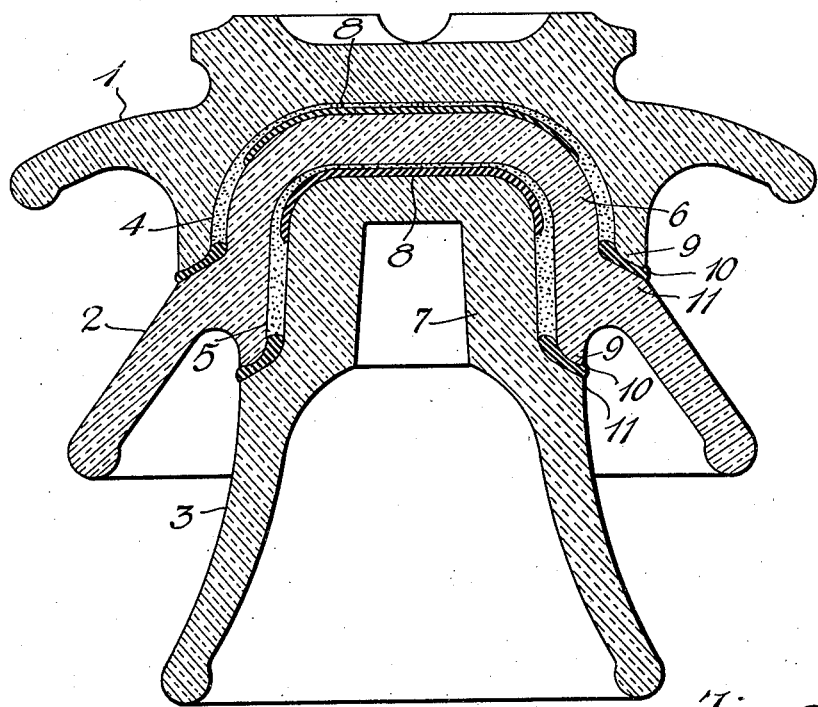
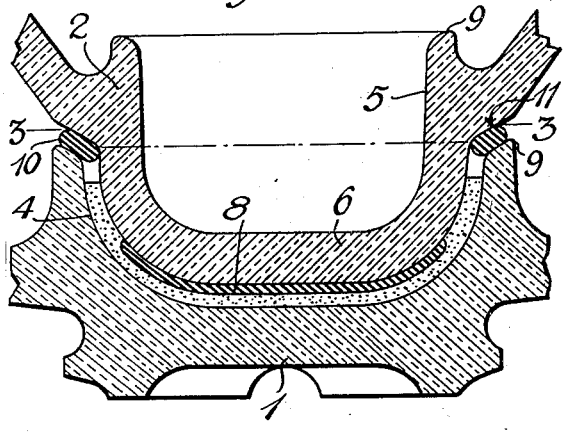
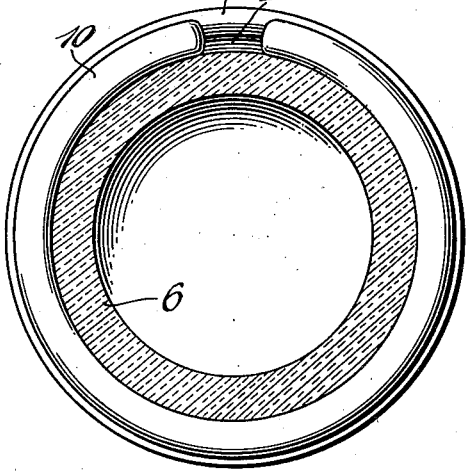

1,647,695

UNITED STATES PATENT OFFICE.

KENT ALLEN HAWLEY, OF VICTOR, NEW YORK, ASSIGNOR TO LOCKE INSULATOR CORPORATION, OF BALTIMORE, MARYLAND, A CORPORATION OF MARYLAND.

METHOD OF ASSEMBLING INSULATORS.

Application filed November 8, 1922. Serial No. 599,719.

The invention relates to a method of assembling insulator sections to form a multiple unit insulator of either the pin or suspension type. The principal object, generally considered, is to provide means permitting the ready and rapid assembly of insulator units of the type described above, said means being adapted to act as an adhesive bond to maintain the parts in assembled position so as to permit the handling of the same immediately after assembly without detriment to the insulators.

A still further object of the invention is to provide insulator units with an elastic, compressible or yieldable coating and to so position the same that it will compensate for the difference in thermo expansion or contraction of the units and the cementing medium.

Still another object of the invention is to provide an adhesive substance which will permit of the ready assembly of insulator units, the said substance being also adapted to serve as a gasket to seal the cavity between adjacent insulator sections so as to prevent moisture or air from coming in contact with the cementing compound used to permanently secure the sections together.

Before describing the invention in detail it is believed it will lead to a better understanding of my improvement to point out difficulties now experienced in the assembly of insulator units which make up the complete insulator.

It is of course well known to those skilled in the art that insulators, particularly those of the pin type, when used in connection with transmission lines or in like capacities are made up of a number of insulating sections rigidly connected to each other by Portland cement. Various expedients have been used from time to time to overcome the difficulties experienced in the use of cement as a connecting medium but in spite of these difficulties the use of cement is now practically universal.

The disadvantages arising from the use of cement may be roughly divided into two groups, first, those which occur during the processes of assembling the units, and second, those which occur after the insulators thus assembled are in service.

When the insulating units are to be assembled the cavity in the uppermost unit is filled or partially filled with cement and this unit is then placed over the next adjoining unit so that the stem of the latter extends within and is nested in the cavity of the upper unit. This method is continued, of course, if there are more than two sections to the insulator until the entire insulator is assembled with the parts in nested relation. Great care must be taken to axially aline the sections thus joined and it is often necessary to provide wedges to maintain these parts in alinement. Even with the utmost care in the assembly the percentage of loss due to failure to maintain the parts in alinement is quite large. In addition to the difficulty of properly assembling units there is an even greater disadvantage due to the time required for the cement to firmly set. Until this time has elapsed the slightest jar or handling of the insulators often results in the displacement of the units or the cracking of the partially hardened cement or in fact may often result in the total destruction of the bond between the sections. The length of time required for the initial setting of the cement reduces the output of the insulating plants since after the insulating sections are joined they must be left in the assembly room until the cement has set. This slows down production by rendering impossible the continuous movement of the units from the assembly room to the drying room in the orderly and efficient production of insulators.

The continual increase in bulk of cement which, while gradual, progresses for a period of years when the cement is exposed to the atmosphere and moisture is another disadvantage which arises from the use of cement as a connecting medium for insulator units. The increase in bulk is due, it is believed, to continual hydration of the cement and is greater than the increase in volume due to thermo expansion at the temperatures to which insulators are subjected in service. While attempts have been made to overcome this defect by subjecting the insulators when joined to a steam bath, that is the extreme condition of heat and moisture, it has been found that under certain conditions even this process does not wholly compensate for the increase in bulk of the cement through a period of years. While this increase in bulk is of course measured in very small fractions of an inch it is often sufficient during the rapid thermo changes to which insulators are in service subjected, to subject certain of the units to destructive strains beyond their elastic limit.

A still further objection to the use of cement as the connecting medium between insulator sections is due to the interposition of cement between adjacent surfaces and in intimate contact with the same. Cement is much less elastic than porcelain and also acts as the heat insulation between adjacent sections of porcelain. Consequently, the cement may exert tremendous pressure at points within the cavity and against the outer member upon the sudden contraction of the same. This contraction is greatest at the thinnest point in the insulator, that is the point at which there is a change in the angular direction of the porcelain.

All of these objections are obviated by the method hereinafter shown and described. Briefly, these objections are overcome as follows:

First, by providing an adhesive substance interposed between and in contact with adjacent sections, the adhesive substance serving as a temporary binder to hold the same in fixed position until the cement has hardened, this temporary binder permitting the handling of the units either before or after the cement has been employed and without reference to the condition of the cement.

Second, by providing a gasket intimately associated with the adjacent sections, which gasket serves to exclude moisture and air from contact with the cement. In fact, the gasket makes a complete air and water tight joint between the sections and consequently prevents the continual hydration of the cement.

Third, by coating a portion of each unit with an elastic compound, the said compound being interposed between the cement and an adjacent porcelain surface and serving as a cushion to absorb and compensate for rapid thermo changes in each section.

Referring now to the drawings:

Figure 1 is a cross sectional view of a multiple unit pin type insulator showing the invention applied thereto.

Figure 2 is a view in section showing fragments of the insulator units in partially assembled position.

Figure 3 is a sectional view taken on the line 3—3 of Figure 2.

The insulator illustrated on the drawing comprises a cap 1, an intermediate section 2, and a base section 3. Although I have illustrated the invention in connection with a three piece insulator it will of course be understood that this is merely illustrative since the invention is equally applicable to pin type insulators having two or more sections and to suspension insulators embodying a single insulating section and a metallic cap and eye bolt.

The sections 1 and 2 are each provided with centrally arranged cavities 4 and 5, respectively, the cavity 4 of section 1 being adapted to receive the neck or stem 6 of the section 2 and likewise the cavity 5 of section 2 is adapted to receive the neck or stem 7 of the section 3.

In carrying out my method I preferably coat the upper portion of the stems 6 and 7 with an elastic material such, for instance, as a refined asphalt or some coal tar derivative, as shown at 8 in the drawings. This elastic coating preferably extends downwardly to a point intermediate the ends of the vertical or upright walls forming the respective stems, and is in the position to counteract and offset the expansive action of the cement during thermo changes, at points adjacent the area of maximum stress, that is the points in the insulators where there is a change in the angular direction of the porcelain.

The next step in my process is to place around the shoulder 9 of each nested unit a strip of compressible adhesive material 10 which is adapted to engage the cooperating shoulder 11 of the adjacent unit and which is preferably adapted to extend substantially around the circumference of the insulating unit to which the same is applied. There is preferably provided a gap ranging from a fraction of an inch to an inch or more in width between the adjacent ends of each strip for a purpose to be hereinafter described. After the sections 2 and 3 are thus treated, section 1 is placed over the stem 6 of the section 2 and section 3 assembled with section 2. The parts are then placed within a jig or centering machine and are pressed into proper assembled position.

The cement then may be introduced between the sections through the opening in the adhesive strip or band by a compression device analogous to a grease gun or by any other method desired. By this method the cement completely fills the void intervening between each adjacent section. If desired, the cement may be placed within the cavity of each of the several units and the parts then assembled and subjected to pressure, the excess cement being allowed to escape through the opening in each respective strip.

Irrespective of whether the cement is forced within the cavities or the insulator sections are provided with cement prior to the assembly thereof, the adhesive compound or strip serves to maintain the parts in their proper assembled position and permits the immediate removal of the joined sections from the assembly room. By this method a single centering machine may be used for innumerable insulators and after the insulators have been assembled under pressure they may be roughly handled without detriment to the bond between the sections.

As a final step in my process I preferably subject the cemented insulators to the steam bath process described in the Lapp Patent No. 1,170,287, and after the insulators have been removed from the steam bath I close the gap in each adhesive strip by applying to the sections a small portion of the same material and join the same to the ends of the strip and to the adjacent insulator sections by applying a heating device to this adhesive material. The insulators are then ready for shipment or testing, as the case may be.

While I have described my method in a certain sequence it is to be understood that these steps do not necessarily follow in the exact order named and may be rearranged as desired without differentiating from the invention.

I claim:

1. The method of connecting insulator parts adjoining ones of which are formed respectively with a recess and a projection, comprising applying adhesive material to the projection of one element to extend over the end and about a portion of the side thereof, applying compressible waterproof adhesive material to the edge of one part at the area where it is to contact with the adjacent part, assembling the parts in nested relation and applying axial pressure whereby the adhesive material will unite and temporarily connect the parts.

2. The method of connecting insulator parts adjoining ones of which are formed respectively with a recess and a projection, comprising applying adhesive material to the projection of one element to extend over the end and about a portion of the side thereof, applying compressible waterproof adhesive material to the edge of one part at the area where it is to contact with the adjacent part, assembling the parts in nested relation and applying axial pressure whereby the adhesive material will unite and temporarily connect the parts and subsequently introducing cementitious material to fill the space between the parts unoccupied by said adhesive material.

3. The method of connecting insulator elements having stem and socket engagement therebetween, comprising applying an adhesive elastic material upon the end of the stem and a portion of the side wall thereof merging into the end, applying an elastic adhesive material to the edge of one element at the area where it is designed to engage the adjacent element, arranging the elements in nested relation and applying axial pressure for temporarily holding the elements in assembled relation.

4. The method of temporarily connecting insulator elements having stem and socket engagement and further having shoulder and edge engagement, comprising applying an elastic adhesive material upon the stem to extend over the end thereof and partly about the side wall where it merges into the end, placing an elastic adhesive waterproof material upon the edge of one element, nesting the elements with the stem seated within the socket and with the edge opposite the shoulder, and subjecting the nested elements to axial pressure.

5. The method of connecting insulator elements having socket and projection engagement and having a respective coacting shoulder and edge, comprising applying an adhesive elastic substance upon the projection to cover the end and extend about a portion of the side merging into the end, applying an interrupted ring of waterproof elastic adhesive material to the edge, nesting the elements, applying axial pressure to effect temporary connection thereof permitting handling, filling with cementitious material the space between the projection and socket unoccupied by said adhesive material, and subsequently closing the interruption in said ring.

6. The method of connecting parts of a multiple unit insulator which consists in assembling the parts in nested relation, applying a ring-like strip of adhesive material to one of said parts, filling the space between said nested parts with a cementitious compound, subjecting said nested parts to pressure, and finally inserting adhesive material between said nested parts to completely seal the opening between the same.

7. The method of connecting a plurality of insulating members having stem and socket engagement therebetween which consists in coating a portion of the stem of at least some of said members with an elastic compound, partially surrounding the stems of said members with a band of adhesive material, assembling said members in nested relation, subjecting said nested members to axial pressure, and finally filling the space between the nested portions with a cementitious compound.

8. The method of connecting a plurality of insulating members having stem and socket engagement therebetween which consists in coating a portion of the stem of at least some of said members with an elastic compound, partially surrounding the stems of said members with a band of adhesive material, assembling said members in nested relation, subjecting said nested members to axial pressure, filling the space between said nested portions with a cementitious compound, and finally inserting adhesive material between the ends of each band to form a seal enclosing said cementitious compound.

In testimony whereof I affix my signature.

KENT ALLEN HAWLEY.